United States Patent
Sakaguchi

(10) Patent No.: US 7,365,936 B2
(45) Date of Patent: Apr. 29, 2008

(54) MEDIA CARTRIDGE AUTOLOADER

(75) Inventor: Tomoaki Sakaguchi, Tama (JP)

(73) Assignees: Mitsumi Electric Co., Ltd., Tokyo (JP); Quantum Corporation, San Jose, CA (US)

( * ) Notice: Subject to any disclaimer, the term of this patent is extended or adjusted under 35 U.S.C. 154(b) by 350 days.

(21) Appl. No.: 11/274,696

(22) Filed: Nov. 15, 2005

(65) Prior Publication Data
US 2007/0058282 A1 Mar. 15, 2007

(30) Foreign Application Priority Data
Sep. 12, 2005 (JP) ............................. 2005-264077

(51) Int. Cl.
*G11B 15/68* (2006.01)
(52) U.S. Cl. ....................................... 360/92
(58) Field of Classification Search ................. 360/92, 360/98.04; 369/30.72, 30.39, 30.45
See application file for complete search history.

(56) References Cited

U.S. PATENT DOCUMENTS 7,158,341 B2 * 1/2007 Taki et al. ..................... 360/92

| | | | |
|---|---|---|---|
| 2003/0095355 A1 * | 5/2003 | Shimanuki | 360/92 |
| 2003/0117744 A1 * | 6/2003 | Tanaka | 360/92 |
| 2004/0008445 A1 * | 1/2004 | Vanderheyden | 360/92 |
| 2005/0162775 A1 * | 7/2005 | Ojima et al. | 360/92 |
| 2005/0207058 A1 * | 9/2005 | Taki et al. | 360/92 |

FOREIGN PATENT DOCUMENTS

JP     2003 45102     2/2003

* cited by examiner

*Primary Examiner*—Allen Cao
(74) *Attorney, Agent, or Firm*—Ladas & Parry LLP

(57) ABSTRACT

A media cartridge autoloader is disclosed that includes a mail slot, a media cartridge storage section, a media drive into which a media cartridge is loaded, and a media cartridge picker for moving the media cartridge between two or more of the mail slot, the media drive and the cartridge storage section. The media cartridge picker includes a turntable capable of supporting the media cartridge and rotating to change the orientation of the media cartridge supported thereby, a turntable rotating mechanism for rotating the turntable, a media cartridge transport mechanism provided on the turntable and configured to transport the media cartridge onto and off of the turntable, and a media cartridge ejection detecting mechanism provided in a position opposing the media drive. The media cartridge ejection detecting mechanism includes a switching member to which a pressing force is applied by the media cartridge ejected from the media drive.

21 Claims, 17 Drawing Sheets

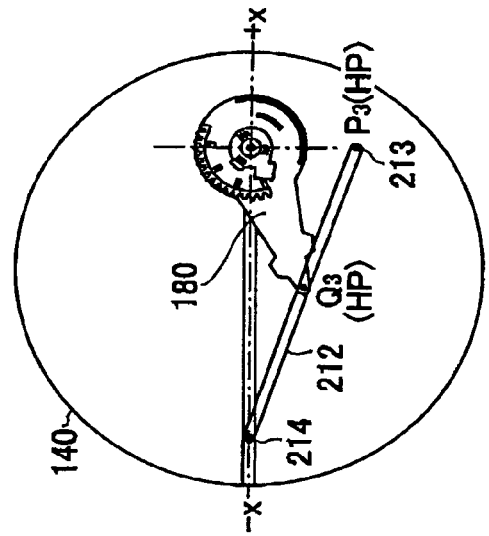
FIG.16A3
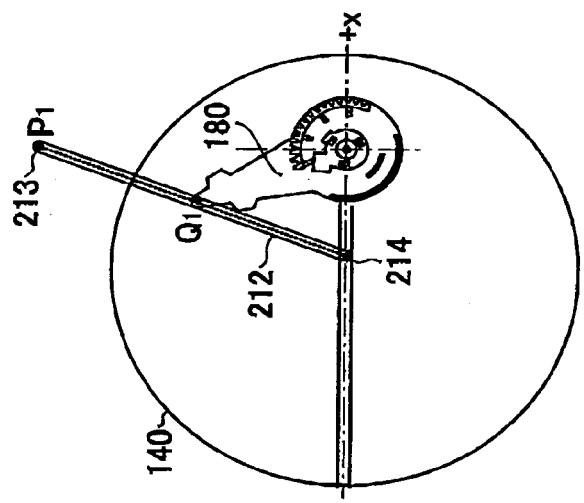
FIG.16A2
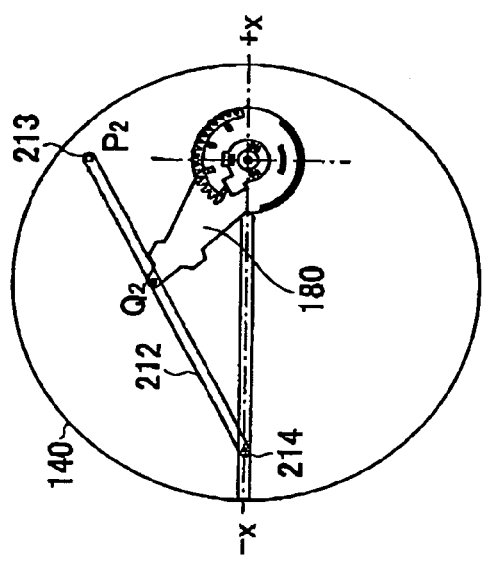
FIG.16A1

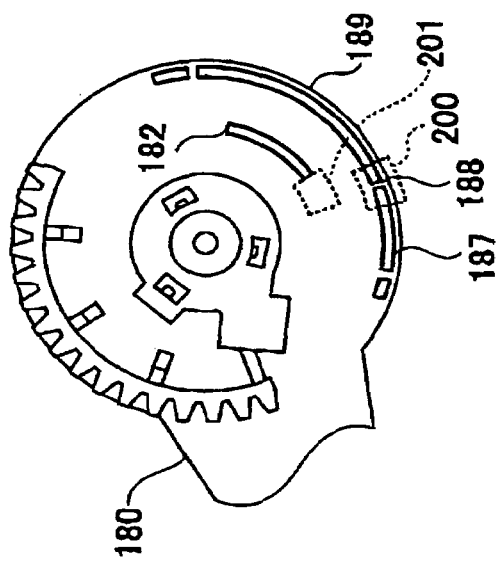
FIG.16B1
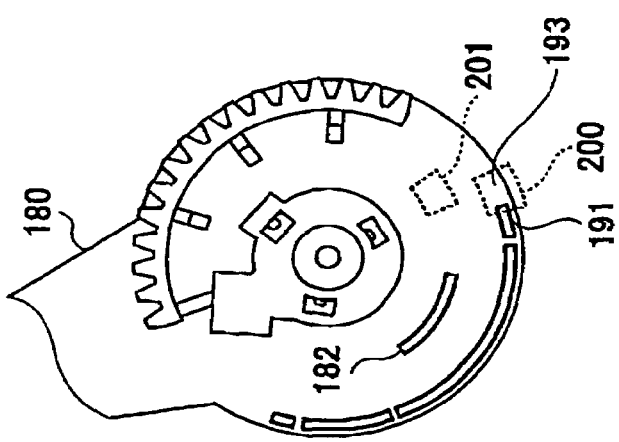
FIG.16B2
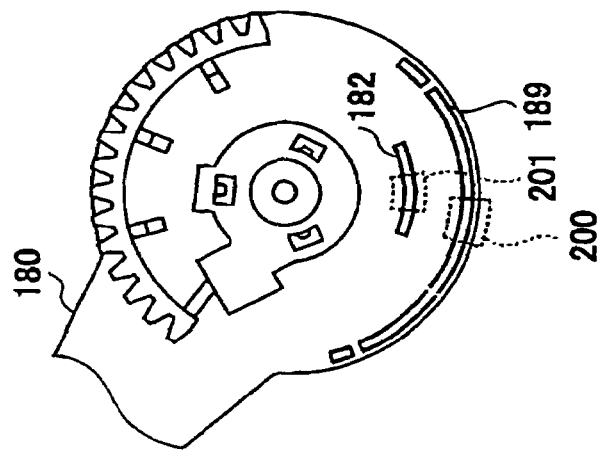
FIG.16B3

MEDIA CARTRIDGE AUTOLOADER

BACKGROUND OF THE INVENTION

1. Field of the Invention

The present invention relates to a media cartridge autoloader, and particularly relates to a media cartridge picker that moves a media cartridge in a media cartridge autoloader serving as a data storage unit.

2. Description of the Related Art

A typical media cartridge autoloader includes a media cartridge picker in the center, a mail slot at the front side, at least one read/write media drive at the rear side, and media cartridge transport magazines at the lateral sides. The media cartridge picker is configured to retrieve a media cartridge and transport it among the mail slot, the media drive, and the media cartridge transport magazines. The media drive includes a media cartridge ejecting mechanism for ejecting the media cartridge.

After the media cartridge ejecting mechanism ejects the media cartridge from the media drive, the media cartridge transport mechanism of the media cartridge autoloader retrieves and transports the ejected media cartridge.

In order to determine whether the operation of the media cartridge transport mechanism can be started, a mechanism for detecting the proper ejection of the media cartridge from the media drive is desired.

SUMMARY OF THE INVENTION

The present invention provides a media cartridge autoloader including: a mail slot; a media cartridge storage section; a media drive into which a media cartridge is loaded; and a media cartridge picker for moving the media cartridge between two or more of the mail slot, the media drive and the cartridge storage section. In one embodiment, the media cartridge picker includes a turntable that supports the media cartridge. The turntable rotates to change the orientation of the media cartridge supported thereby. The cartridge picker also includes a turntable rotating mechanism for rotating the turntable, a media cartridge transport mechanism provided on the turntable and configured to transport the media cartridge onto and off of the turntable, and a media cartridge ejection detecting mechanism provided in a position opposing the media drive. In one embodiment, the media cartridge ejection detecting mechanism includes a switching member to which a pressing force is applied by the media cartridge ejected from the media drive.

Furthermore, the present invention provides a media cartridge picker for moving a media cartridge between two or more of a mail slot, a media drive and a cartridge storage section included in a media cartridge autoloader. In one embodiment, the media cartridge picker includes a turntable capable of supporting the media cartridge, the turntable rotating to change the orientation of the media cartridge supported thereby; a turntable rotating mechanism for rotating the turntable; a media cartridge transport mechanism provided on the turntable and configured to transport the media cartridge onto and off of the turntable; and a media cartridge ejection detecting mechanism provided in a position opposing the media drive; wherein the media cartridge ejection detecting mechanism includes a switching member to which a pressing force is applied by the media cartridge ejected from the media drive.

BRIEF DESCRIPTION OF THE DRAWINGS

FIGS. 16A1-16A3 and 16B1-16B3 are schematic illustrations showing operations of the media cartridge transport mechanism.

DETAILED DESCRIPTION OF THE PREFERRED EMBODIMENT

Exemplary embodiments of the present invention are described hereinafter with reference to the accompanying drawings.

First Embodiment

A first embodiment is described in the following order.

1. Configuration and Operation Overview of Tape Cartridge Autoloader

2. Configuration and Operation of Tape Cartridge Picker 102

3. Configuration of Tape Cartridge Ejection Detecting Mechanism

4. Operation of Retrieving Tape Cartridge in Tape Drive 101 and Transporting Tape Cartridge onto Turntable 140

5. Adjustment of Height Position of Bracket 191

1 [Configuration and Operation Overview of Tape Cartridge Autoloader 100]

Figure 1:
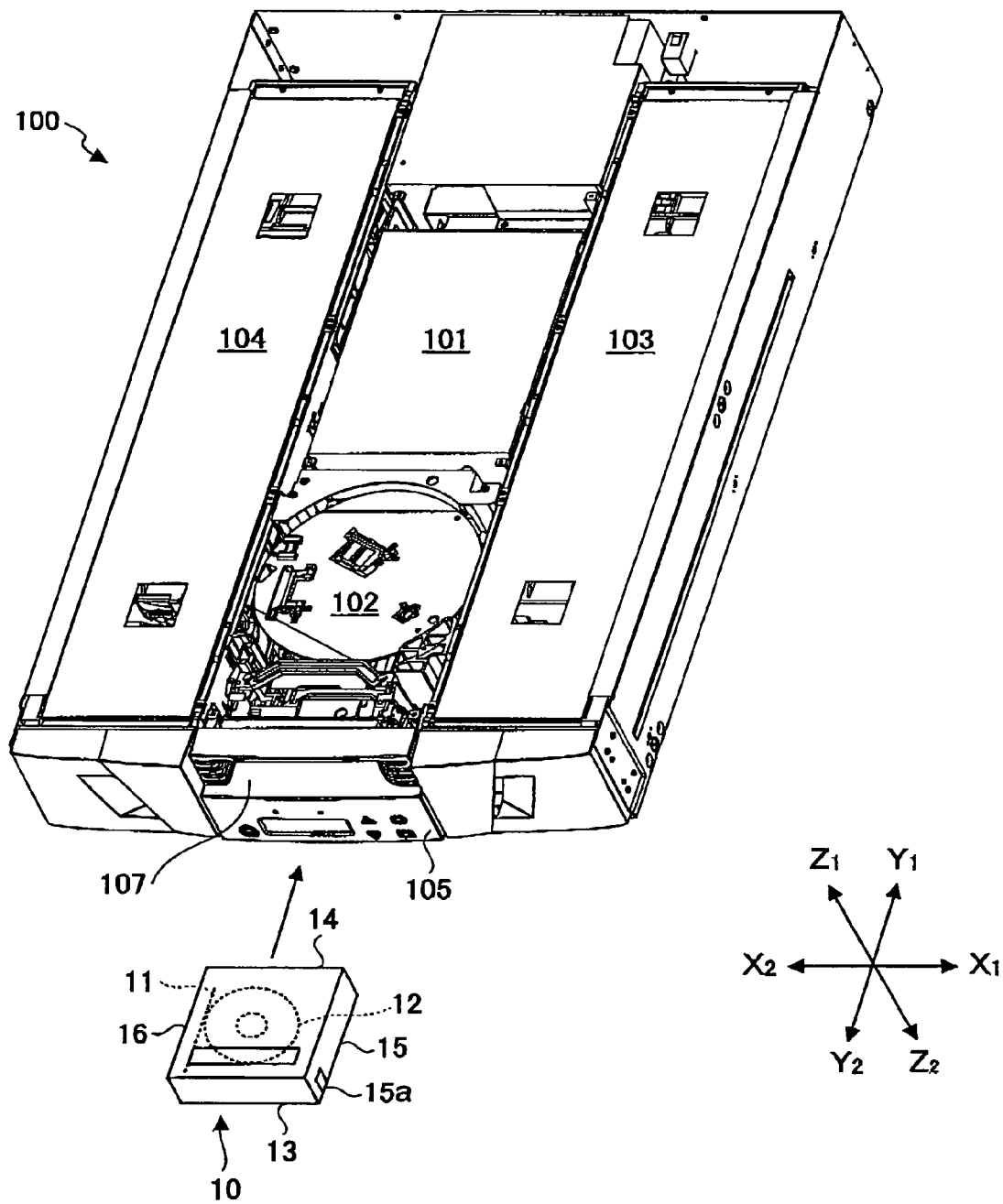
FIG. 1 is a perspective view illustrating a media cartridge autoloader with an upper cover thereof removed according to a first embodiment of the present invention.

FIG. 1 is a perspective view illustrating a media cartridge autoloader 100 with an upper cover thereof removed according to the first embodiment of the present invention.

In the embodiments illustrated in the figures, the media cartridge autoloader is used with one or more tape cartridges, and is therefore referred to as a tape cartridge autoloader. It is recognized, however, that although the following description and the figures provided herein pertain particularly to an autoloader used for tape cartridges, any other suitable type of media cartridge can equally be used with the present invention, such as an optical disk cartridge, as one non-exclusive example. The embodiments disclosed herein are not intended to limit the scope of the present invention in any manner to use with tape cartridges or any other particular type of media. In other words, it is understood that the term "tape" as used herein can equally be substituted for the term "media".

Figure 2:
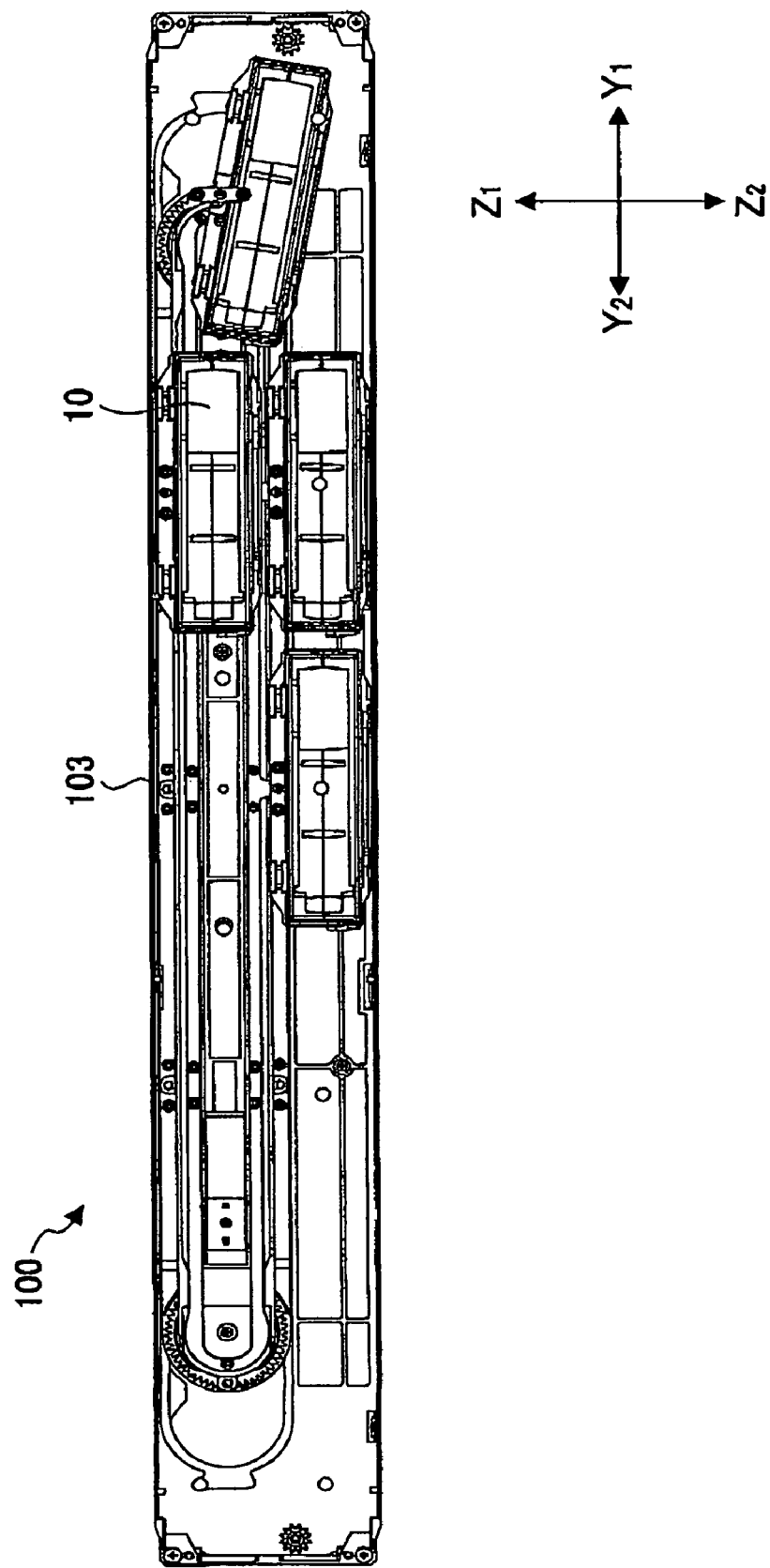
FIG. 2 is a side view illustrating the media cartridge autoloader of FIG. 1 with a side cover thereof removed.

FIG. 2 is a side view illustrating the tape cartridge autoloader 100 with a side cover thereof removed. Throughout the drawings, the width direction is indicated by a line X1-X2, the depth direction is indicated by a line Y1-Y2, and the height direction is indicated by a line Z1-Z2.

In the embodiment illustrated in FIG. 1, the tape cartridge autoloader 100 generally includes a control panel 105, a mail slot 107, both on a front panel, a tape cartridge picker 102 at a position opposing the mail slot 107, tape cartridge transport magazines (tape cartridge storage section(s)) 103 and 104 located one on each of the X1 side and the X2 side, and a tape drive 101 on the Y1 side of the tape cartridge picker 102. A suitable tape cartridge 10 is applied to the tape cartridge autoloader 100. It is recognized that the positioning and/or orientation of the above components of the autoloader 100 can be varied from that shown in FIG. 1 depending upon the design requirements of the autoloader 100.

Referring to FIG. 1, the tape cartridge 10 includes a magnetic tape 11 wound on a single reel 12 therein such that the magnetic tape 11 is pulled out from a rear face of the tape cartridge 10. The tape cartridge 10 includes a front face 13, a rear face 14, side faces 15 and 16, and a notch 15a formed on the side face 15 which a cartridge pin (to be described below) engages.

Referring to FIG. 2, the tape cartridge transport magazines 103 and 104 are each configured to store plural tape cartridges 10 with the front faces 13 opposing the tape cartridge picker 102. The tape cartridge transport magazines 103 and 104 can also transport the tape cartridges 10 along a racetrack path elongated in the Y1-Y2 direction.

The tape drive 101 is operable to read and/or write data from or to the magnetic tape 11 pulled out from the loaded tape cartridge 10. The tape drive 101 includes a tape cartridge ejecting mechanism 101a (See FIG. 5). Plural types of tape drives with different heights are available so that the one drive is selected from them and attached to the cartridge autoloader 100. For this operation, the tape cartridge picker 102 is provided with a turntable lifting mechanism 150 (to be described below)

Figure 3:
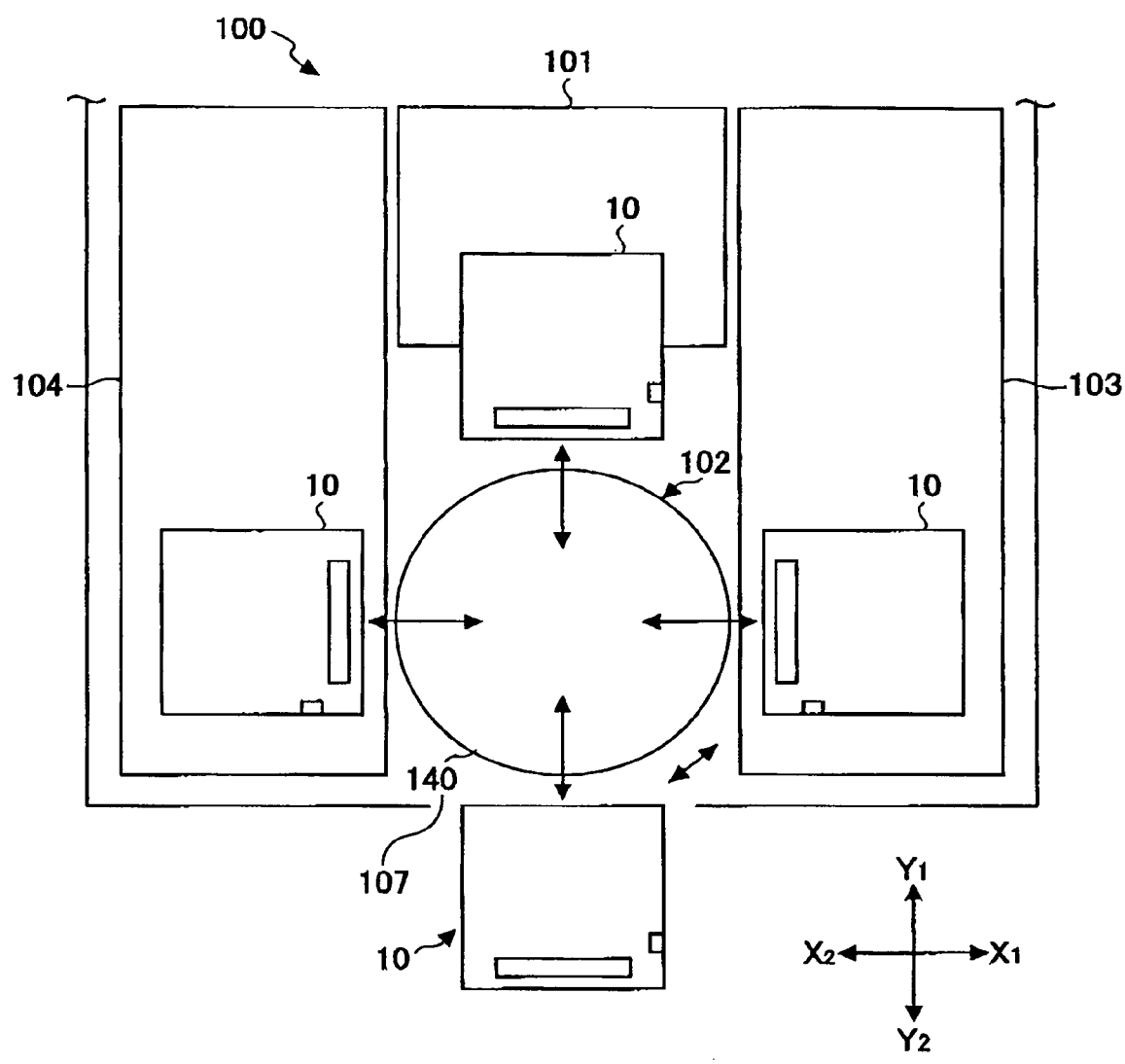
FIG. 3 is a schematic illustration showing operations of a media cartridge picker.

Referring to FIG. 3, the tape cartridge picker 102 is configured to transport the tape cartridge 10 onto or off of a turntable 140 for operations such as loading the tape cartridge 10 inserted through the mail slot 107 into the tape drive 101, retrieving the tape cartridge 10 from the tape cartridge transport magazines 103 and 104 to load the tape cartridge 10 into the tape drive 101, retrieving the tape cartridge from the tape drive 101 to return the tape cartridge 10 to one of the tape cartridge transport magazines 103 and 104, and ejecting the tape cartridge 10 through the mail slot 107. The tape cartridge picker 102 is also configured to rotate the turntable 140 by a predetermined rotational increment, such as in 90-degree increments, although it is recognized that the predetermined rotational increment can be less than or greater than 90 degrees based on the design requirements of the autoloader 100. Further, the tape cartridge picker 102 can also raise/lower the turntable 140 as necessary. When the turntable 140 is rotated, the orientation of the tape cartridge 10 is changed.

2 [Configuration of Tape Cartridge Picker 102]

Figure 4:
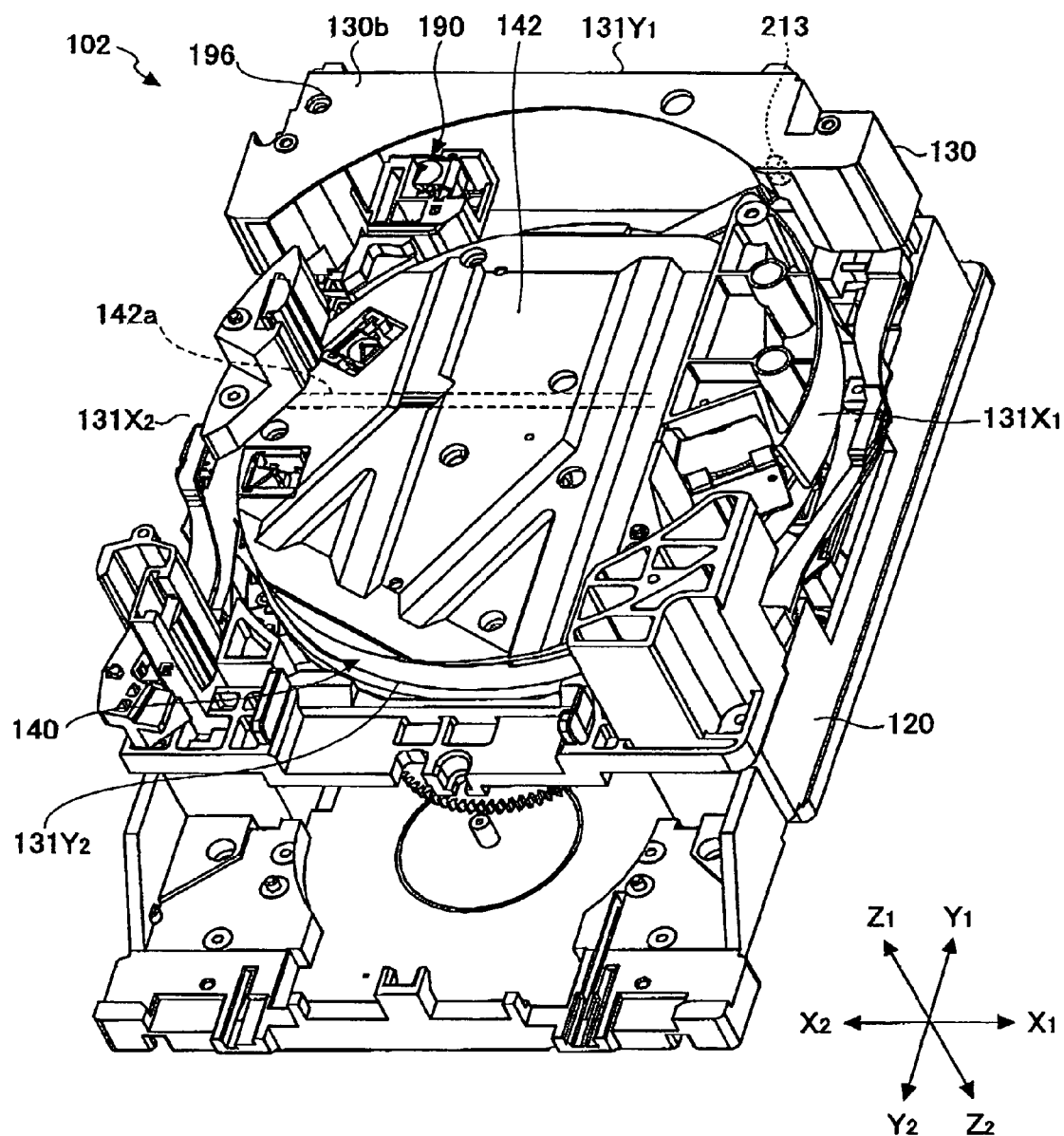
FIG. 4 is a perspective view illustrating the media cartridge picker.
Figure 5:
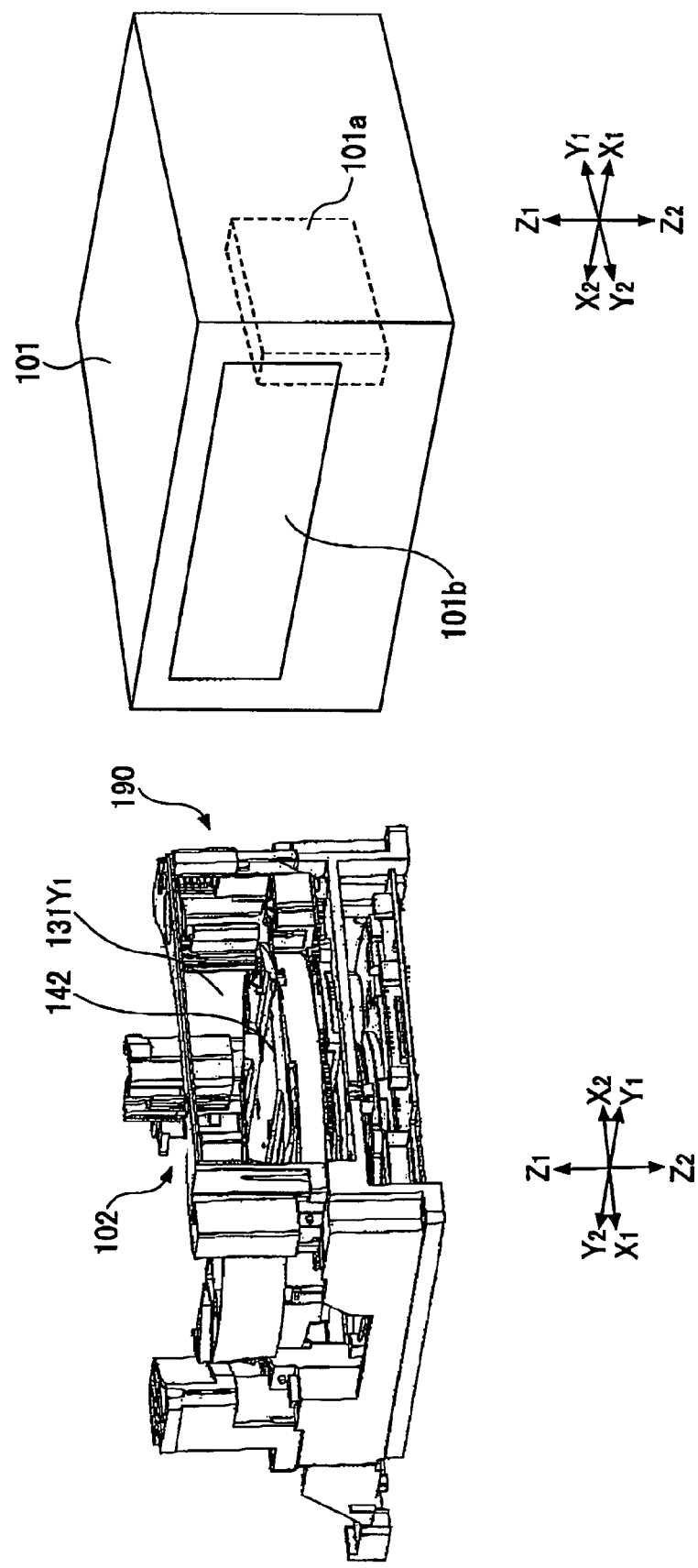
FIG. 5 is a perspective view illustrating a media cartridge picker including a media cartridge ejection detecting mechanism and a media drive 101 in an oppositely facing manner.
Figure 6:
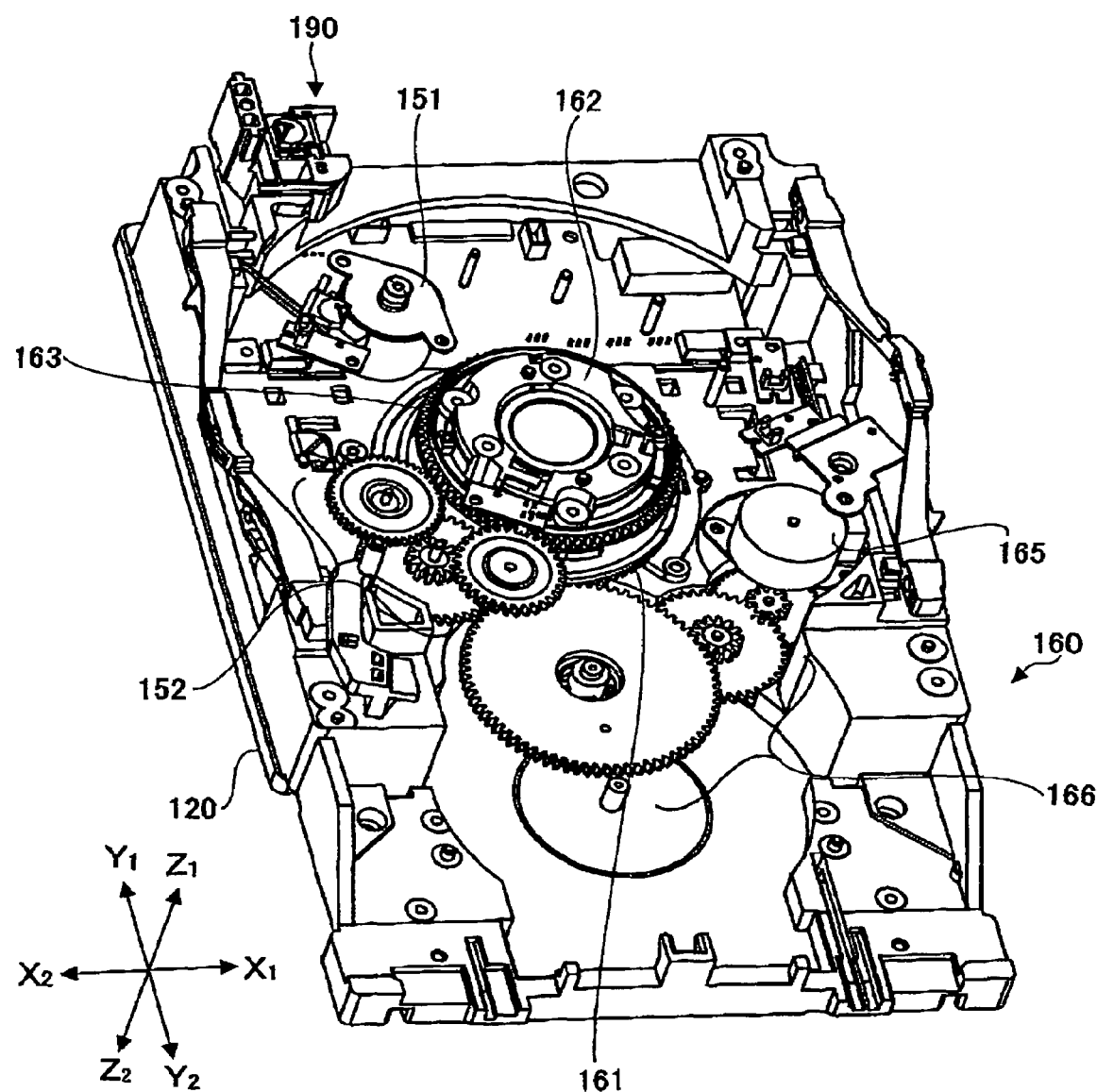
FIG. 6 is a perspective view illustrating the media cartridge picker with a pillar and a turntable removed.
Figure 7:
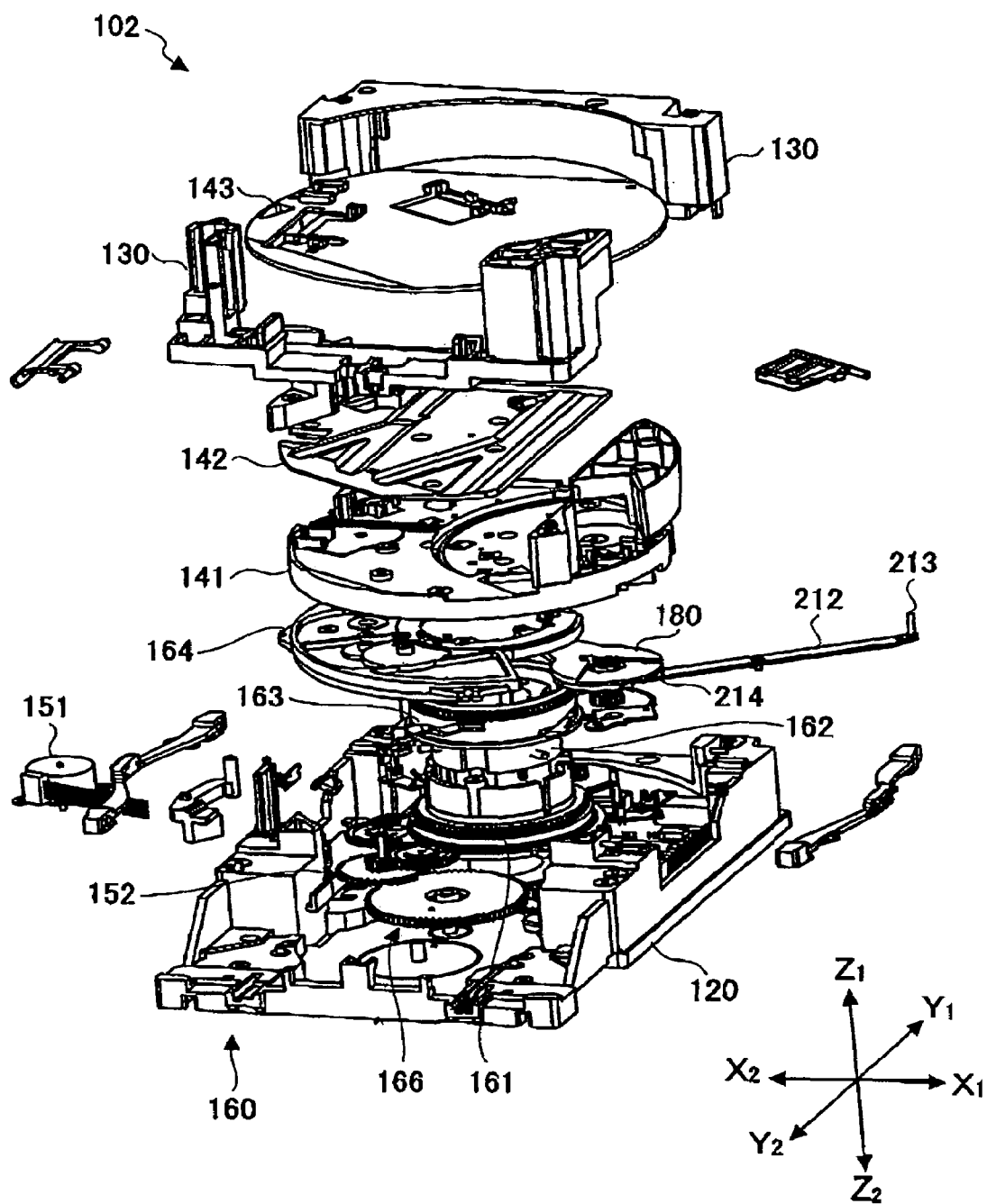
FIG. 7 is an exploded perspective view illustrating the media cartridge picker.
Figure 8:
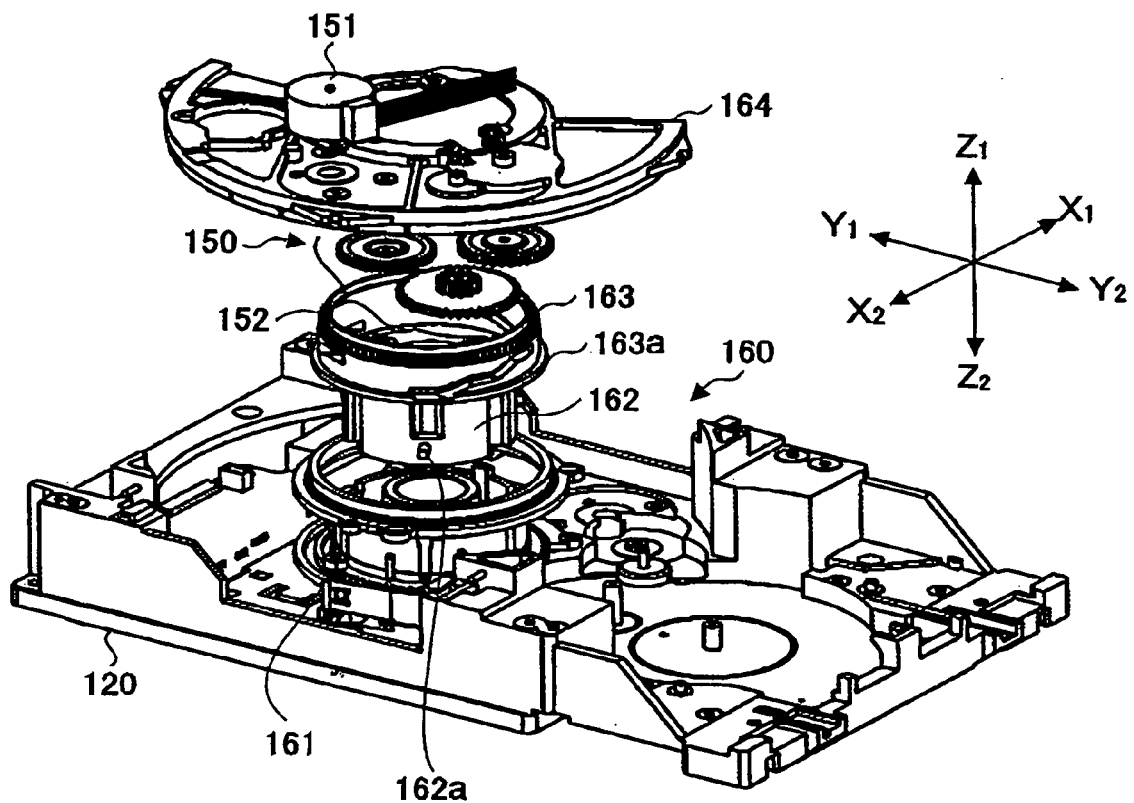
FIG. 8 is an exploded perspective view illustrating a turntable lifting mechanism of FIG. 7 in detail.

FIG. 4 illustrates the tape cartridge picker 102 with an upper plate 143 of the turntable 140 removed. FIG. 5 illustrates the tape cartridge picker 102 and the tape drive 101 opposing each other. FIG. 6 illustrates the tape cartridge picker 102 with a pillar 130 and the turntable 140 removed. FIG. 7 is an exploded perspective view illustrating the tape cartridge picker 102. FIG. 8 illustrates the turntable lifting mechanism 150 in detail.

Referring to FIG. 4, the tape cartridge picker 102 (FIG. 1) includes a base 120, the pillar 130 mounted on the base 120, the turntable 140 configured to support the tape cartridge 10, the turntable lifting mechanism 150 (FIG. 8) configured to slightly raise and lower the turntable 140 for height position adjustment, a turntable rotating mechanism 160 (FIG. 6) configured to rotate the turntable 140 by a predetermined rotational increment, such as every 90 degrees, for example, and a tape cartridge ejection detecting mechanism 190 (FIG. 5). Further, In the embodiment shown in FIG. 4, the tape cartridge picker 102 has ports 131X1, 131X2, 131Y1, and 131Y2 on four sides thereof.

In one embodiment, a rotating ring gear 161, a cylindrical stand 162, a lifting ring gear 163, and a sub base 164 are disposed on the base 120. The rotating ring gear 161 is rotatably attached on the base 120. The cylindrical stand 162 is arranged at the inner side of the rotating ring gear 161 and the lifting ring gear 163 so as to be rotated along with the rotating ring gear 161 and be raised independently from the rotating ring gear 161. The lifting ring gear 163 is arranged at the upper side of the rotating ring gear 161 so as to be rotated independently from the rotating ring gear 161. A boss 162a of the cylindrical stand 162 is configured to engage a diagonal groove 163a of the lifting ring gear 163. When the ring gear 161 rotates, the cylindrical stand 162 is rotated. When the lifting ring gear 163 rotates, the cylindrical stand 162 is raised/lowered. The sub base 164 is a semi-circular plate fixed to a position slightly separated from and at the upper side of the base 120.

Figure 9:
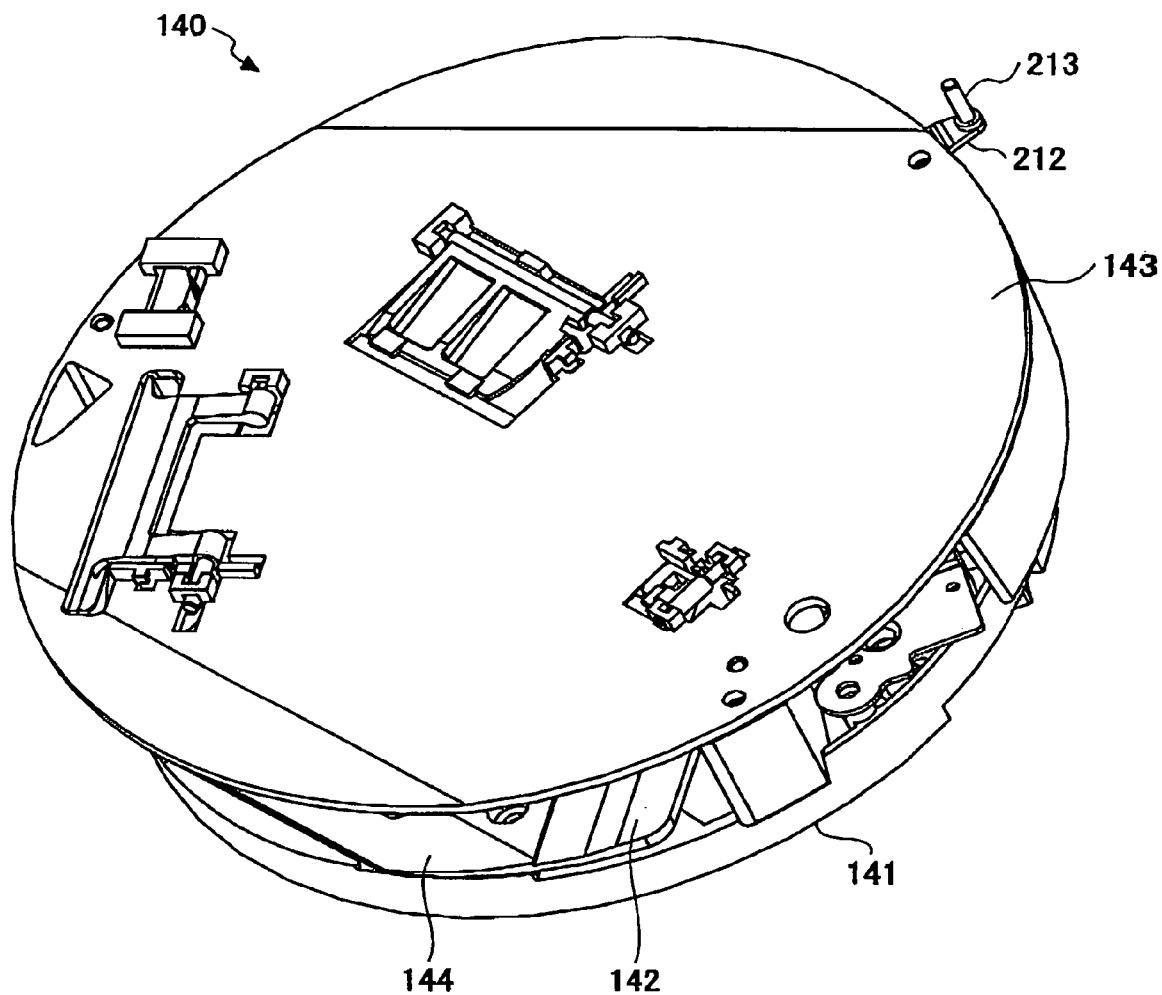
FIG. 9 is a perspective view illustrating a turntable.

Referring to FIG. 9, the turntable 140 includes a base plate 141, a floor plate 142, the upper plate 143, and a clearance 144 between the floor plate 142 and the upper plate. 143 to receive the tape cartridge 10. The base plate 141 is screwed onto the cylindrical stand 162 (FIG. 7).

Referring to FIG. 8, the lifting mechanism 150 includes a stepping motor 151, a gear train 152, and the lifting ring gear 163. Both the stepping motor 151 and the gear train 152 are provided on the base plate 141.

As shown in FIG. 6, the turntable rotating mechanism 160 includes a stepping motor 165, a gear train 166, and the rotating ring gear 161, all of which are provided on the sub base 164 (FIG. 7).

The lifting mechanism 150 has a function of initializing the turntable 140 by raising/lowering the turntable 140 to a home position thereof in the Z direction. The turntable rotating mechanism 160 has a function of initializing the turntable 140 by rotating the turntable 140 to the home position in the rotation direction. The home position of the turntable 140 is a position where a y-axis (to be described later) becomes parallel to the Y-axis. This lifting mechanism initialization operation and the turntable rotating mechanism initialization operation apply a method of moving an object to an operation end position defined as a reference position, and then moving the object back by a predetermined distance. The same method is applied to operations for initializing a tape cartridge transport mechanism.

Figure 10:
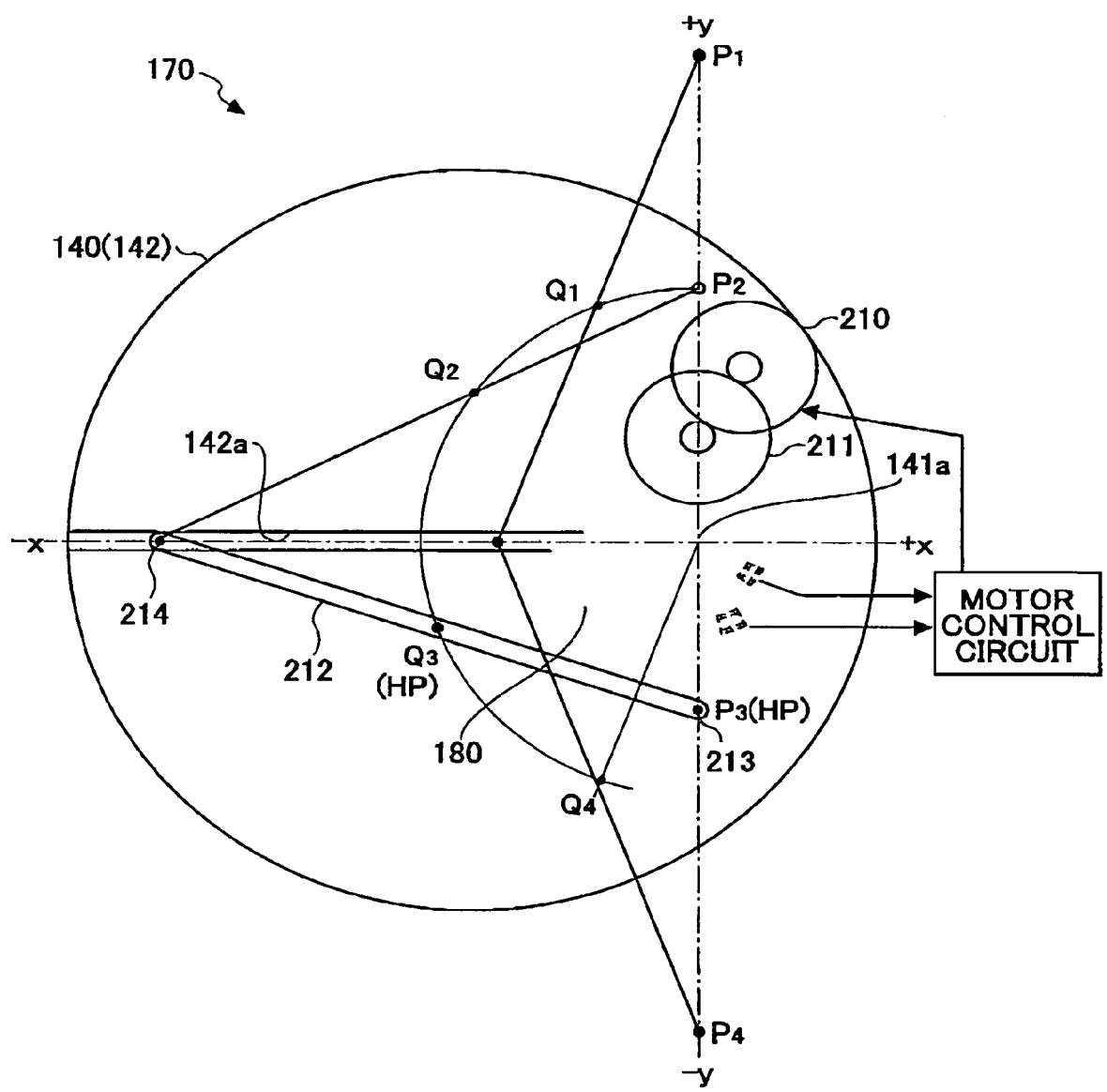
FIG. 10 is a schematic illustration showing a media cartridge transport mechanism.

Referring to FIG. 10, the turntable 140 applies coordinates wherein the position of a pin 141a (to be described below) is defined as the origin, a guide groove 142a (to be described below) as an x-axis, an axis passing through the origin and being orthogonal to the x-axis is defined as a y-axis.

A tape cartridge transport mechanism 170 and a stepping motor 210 (to be described later), both shown in FIG. 10, are provided on the base plate 141.

The tape cartridge transport mechanism 170 has a function of moving the tape cartridge 10 between a position on the turntable, i.e., a position in the clearance 144, and a position outside of the tape cartridge picker 102. In one embodiment, the movement of the tape cartridge can be linear. Alternatively, the movement can be arcuate, or can have some other suitable non-linear movement, or a combination of linear and non-linear movement. The tape cartridge transport mechanism 170 includes a rotary arm 180 rotatably attached to the pin 141a formed on the base plate 141, the stepping motor 210 (FIG. 10) configured to reciprocally rotate the rotary arm 180 between positions Q1 and Q4 within a predetermined angular range, a reduction gear mechanism 211 configured to transmit the rotation of the motor 210 at a reduced rotation rate to the rotary arm 180, and a lever 212 with a center part rotatably connected to a tip end of the rotary arm 180. A cartridge pin 213 is vertically fixed to an end of the lever 212, while a pin 214 is fixed to the other end of the lever 212. The pin 214 engages a guide groove 142a formed on a lower face of the floor plate 142. In the embodiment, shown in FIG. 10, the guide groove 142a is substantially linear, although it is understood that the guide groove 142a can be non-linear depending upon the design requirements of the media cartridge picker 102 and the media cartridge autoloader 100.

Referring to FIG. 10, when the motor 210 is driven, the rotary arm 180 is rotated through the reduction gear mechanism 211. Then, the pin 214 is moved within the guide groove 142a along the x-axis, while rotating the lever 212 and moving the cartridge pin 213 between positions P1 and P2 along the y-axis. In one embodiment, the movement of the cartridge pin 213 can be substantially linear. Alternatively, the movement of the cartridge pin 213 can include non-linear movement.

When the rotary arm 180 is rotated from the position Q1, Q2, Q3 to Q4, the cartridge pin 213 is correspondingly moved from the position P1, P2, P3 to P4.

FIG. 16A1 shows the rotary arm 180 rotated to the position Q2 and the cartridge pin 213 correspondingly moved to the position P2 defined as a preparation operation completed position. In the embodiment illustrated in FIGS. 16B1-16B3, the rotary arm 180 includes an inner flag 182, an outer flag 189, an inner photosensor 201 and an outer photosensor 200. In the state shown in FIG. 16B1, the center part of the inner flag 182 opposes the inner photo sensor 201, and the outer flag 189 opposes the outer photo sensor 200. The preparation operation completed position P2 is located within the turntable 140 such that the turntable 140 is rotated without causing the cartridge pin 213 to hit against a column section at a corner section of the pillar 130.

FIG. 16A2 shows the rotary arm 180 rotated maximally in the clockwise direction to the position Q1 and the cartridge pin 213 correspondingly moved to the reference position P1. In this embodiment, the rotary arm 180 also includes a non-flag section 193. In this state, as shown in FIG. 16B2, the non-flag section 193 opposes the outer photo sensor 200.

The inner flag 182 is out of the focus of the inner photo sensor 201 and does not oppose the inner photo sensor 201. The reference position P1 is located outside the turntable 140, and is defined as a start position from which the cartridge pin 213 is moved to the home position P3. Also, the reference position P1 is where the cartridge pin 213 is located when the front face 13 of the tape cartridge 10 is completely pushed out as described below.

FIG. 16A3 shows the rotary arm 180 rotated from the position Q1 to the home position Q3 in the counterclockwise direction and the cartridge pin 213 correspondingly moved to the home position P3. In this embodiment, the rotary arm 180 includes a slit 188. In this state, as shown in FIG. 16B3, the slit 188 opposes the outer photo sensor 200. The inner flag 182 is out of the focus of the inner photo sensor 201, and does not oppose the inner photo sensor 201. The home positions are where the rotary arm 180 and the cartridge pin 213 are located when the tape cartridge picker 102 starts an operation according to a command.

3 [Configuration of Tape Cartridge Ejection Detecting Mechanism 190]

As shown in FIGS. 4 and 5, the tape cartridge ejection detecting mechanism 190 is attached to the pillar 130 on the X2 side of the port 131Y1 facing the tape drive 101. The tape cartridge ejection detecting mechanism 190 detects the tape cartridge 10 that is ejected from an opening 101b of the tape drive 101 by the tape cartridge ejecting mechanism 101a.

Figure 11:
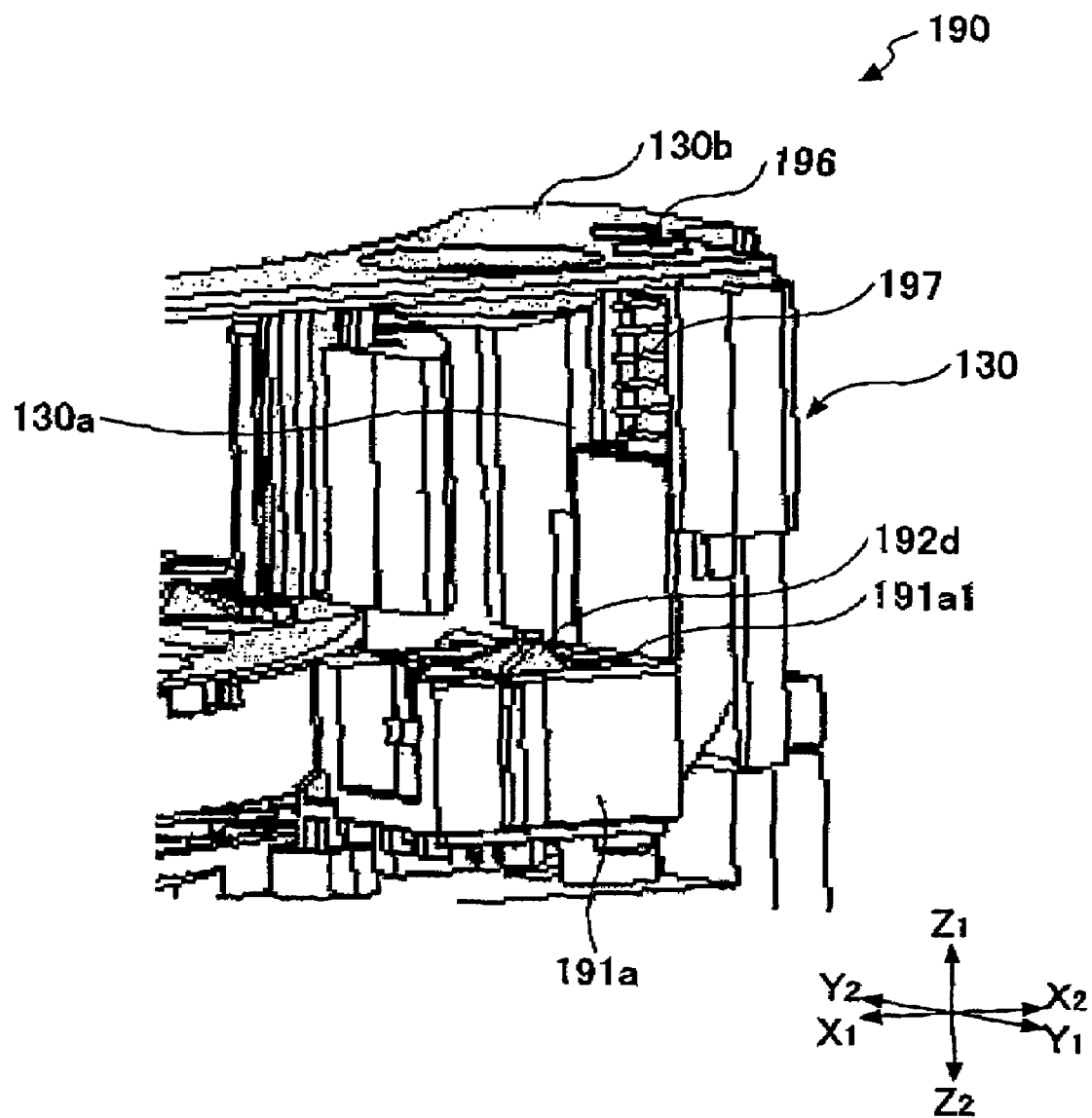
FIG. 11 is an enlarged view illustrating the media cartridge ejection detecting mechanism of FIG. 5.
Figure 12:
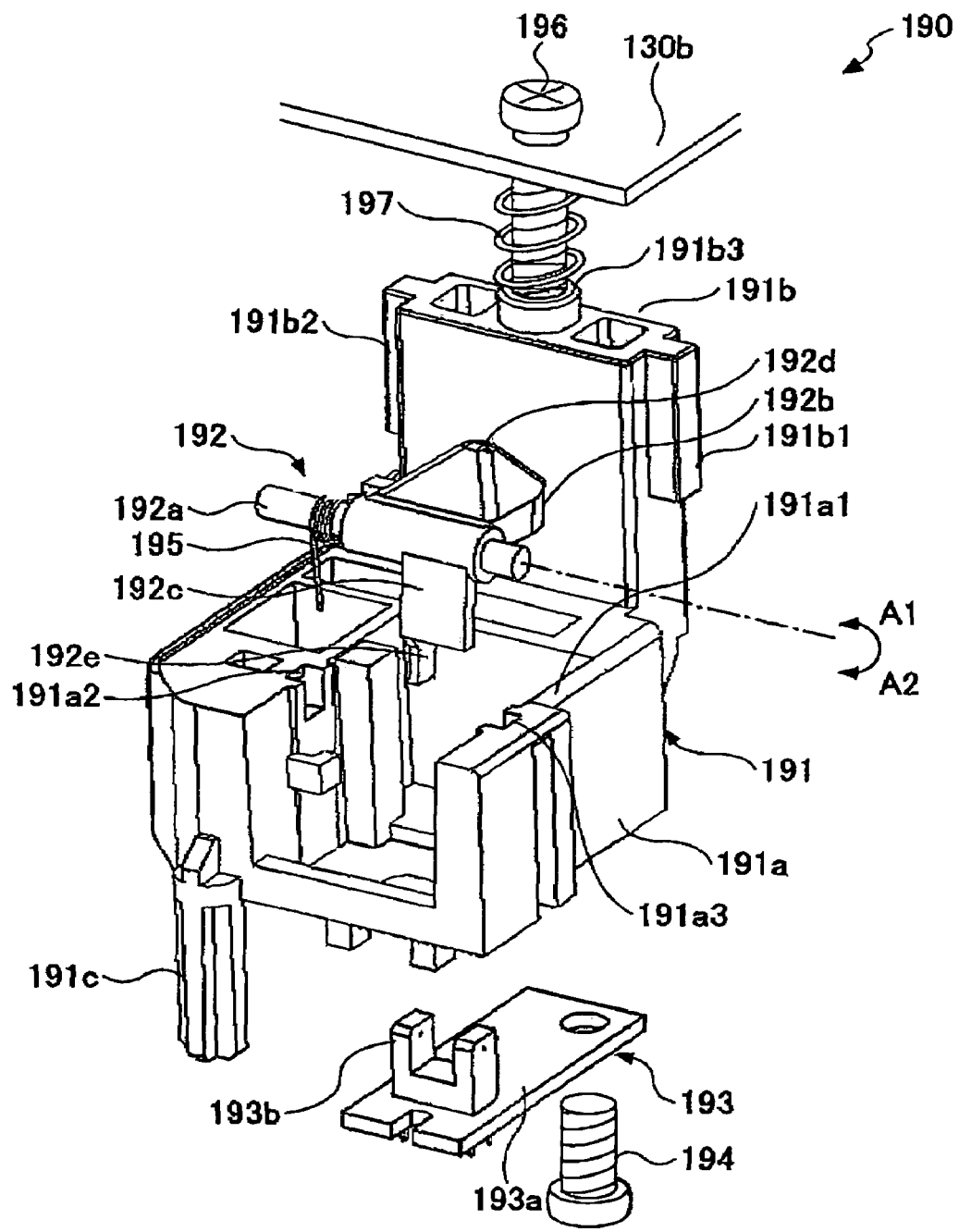
FIG. 12 is an exploded perspective view illustrating a media cartridge ejection detecting mechanism.

FIG. 11 is an enlarged view of the tape cartridge ejection detecting mechanism 190 of FIG. 5. FIG. 12 illustrates an exploded view of the tape cartridge ejection detecting mechanism 190.

As shown in FIGS. 11 and 12, the tape cartridge ejection detecting mechanism 190 has a photointerrupter structure including a bracket 191, a switching member 192 mounted to the bracket 191, and a photocoupler member 193 fastened to the bottom side of the bracket 191 by a screw 194.

The bracket 191 includes a hollow box portion 191a, a plate portion 191b extending in the Z1 direction from the X2 side of the box portion 191a, and a leg portion 191c extending in the Z2 direction from the X1 side of the box portion 191a.

The box portion 191a includes an upper face 191a1 that at least partially supports the ejected tape cartridge 10. Furthermore, the box portion 191a includes bearing portions 191a2 and 191a3. The plate portion 191b includes guide ribs 191b1 and 191b2 disposed on its Y1 side and its Y2 side, and a receiving screw part 191b3 disposed on its edge on the Z1 side.

In one embodiment, the switching member 192 is substantially L-shaped. The switching member 192 includes a shaft portion 192a, a horizontal projecting portion 192b, a vertical projecting portion 192c, a cartridge contact region (in this example, a somewhat quadrangular pyramid portion) 192d protruding upward on top of the horizontal projecting portion 192b, and a lug 192e disposed on the tip end of the vertical projecting portion 192c. The cartridge contact region 192d can have any suitable geometric shape. In non-exclusive alternative examples, the cartridge contact region 192d can be conical, pyramidal, frusto-conical, frusto-pyramidal, spherical, hemi-spherical, or any other suitable shape that satisfies the intent of the cartridge contact region 192d as set forth herein. The switching member 192 is rotatably supported by a spring member 195 engaged with the shaft portion 192a and having the shaft portion 192a engaged with the bearing portions 191a2 and 191a. In one embodiment, the shaft portion 192*a* has an axis that is substantially parallel to the direction of movement of the tape cartridge being ejected from the tape drive.

The photocoupler member 193 includes a base plate 193*a* that is fixed to a photocoupler 193*b* allowing light to be transmitted therethrough.

The switching member 192 is urged to be rotated about the axis in the A1 direction by a spring force of the spring member 195. The cartridge contact region 192*d* protrudes in the Z1 direction from the upper face 191*a*1 of the box portion 191*a*. The lug 192*e* is in a position separated from the photocoupler 193*b*. When a pressing force is applied to the cartridge contact region 192*d* of the switching member 192, the switching member 192 is rotated about the axis in the A2 direction to allow the lug 192*e* to enter the photocoupler 193*b* and shield the light path of the photocoupler 193*b*.

Referring to FIGS. 11 and 12, the bracket 191 is movably attached to the pillar 130 in the Z1-Z2 directions by engaging the guide ribs 191*b*1, 191*b*2 of the plate portion 191*b* into the guide grooves 130*a* of the pillar 130. An adjustment screw 196 having its top portion mounted on a ceiling plate 130*b* of the pillar 130 is fastened to the receiving screw part 191*b*3. Furthermore, a compression coil spring 197 is wound around the adjustment screw 196 between a top face of the plate portion 191*b* and the ceiling plate 130*b* of the pillar 130 for urging the bracket 191 in the Z2 direction. By turning the adjustment screw 196 with a screw driver, for example, the bracket 191 can be moved in the Z1-Z2 directions, to thereby enable adjustment of height position. The adjustment of the height position of the bracket 191 is described below.

4 [operation of Retrieving Tape Cartridge in Tape Drive 101 and Transporting Tape Cartridge onto Turntable 140 (See FIGS. 13A-13E]

After the tape drive 101 completes reading and/or writing data from/to the magnetic tape of the tape cartridge 10 inserted in the tape drive 101, the tape cartridge ejecting mechanism 101*a* ejects the tape cartridge 10, such that a front face 13 side of the tape cartridge 10 projects from the opening 101*b* of the tape drive 101 (See FIG. 5).

Figure 13A:
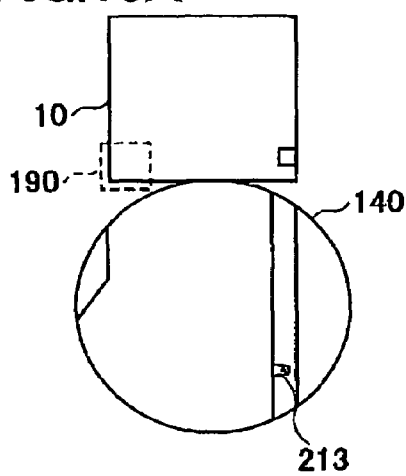
FIGS. 13A-13E are schematic illustrations showing operations of the media cartridge picker at the time when the media cartridge in the media drive is transported onto the turntable.
Figure 13D:
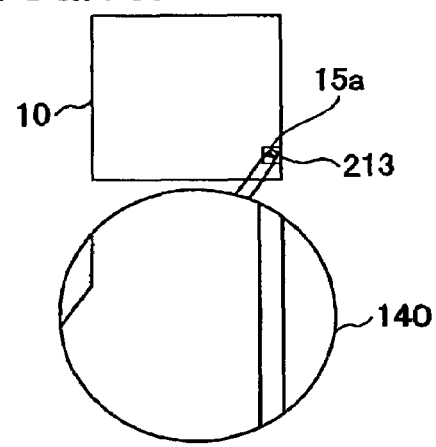
Figure 13B:
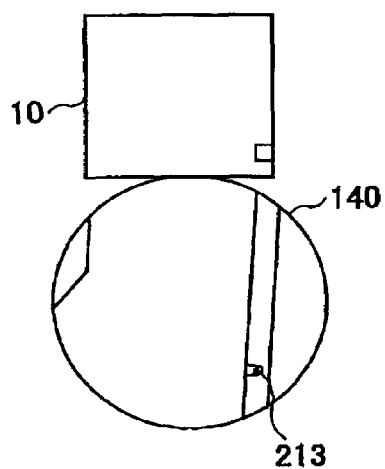
Figure 13E:
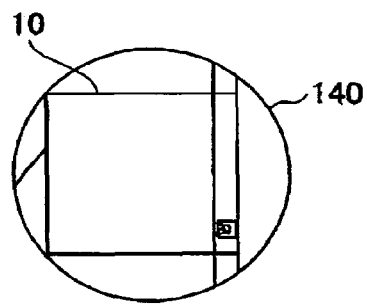
Figure 13C:
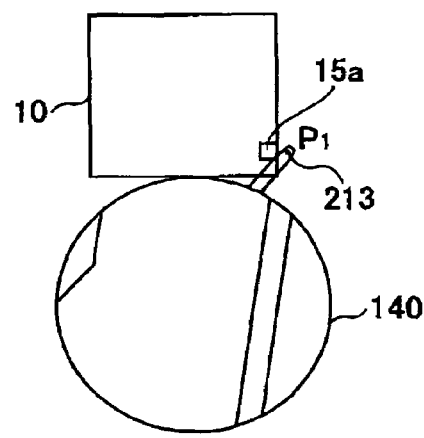

The ejected tape cartridge 10, having its bottom face toward the front face 13 side supported by the upper face 191*a*1 of the box portion 191*a* (See FIG. 12), is placed onto the cartridge contact region 192*d* such that the cartridge contact region 192*d* is pressed downward. The tape cartridge ejection detecting mechanism 190 operates in a manner that, when the cartridge contact region 192*d* is pressed downward, the switching member 192 is rotated in the A2 direction to allow the lug 192*e* to enter the photocoupler 193*b* and shield the light path of the photocoupler 193*b*. FIG. 13A is an illustration of this state.

Accordingly, the tape cartridge ejection detecting mechanism 190 can operate properly even in a case where the tape cartridge 10 has a housing that is transparent.

In a case where the distance between the tape drive 101 and the tape cartridge picker 102 is long, the upper face 191*a*1 of the box portion 191*a* may serve as a platform for receiving the ejected tape cartridge 10.

Upon confirming the operation of the tape cartridge ejection detecting mechanism 190, in one embodiment, the tape cartridge transport mechanism 170 can begin to operate as described below.

First, in this embodiment, the turntable 140 can be rotated by a predetermined rotational increment, such as 3.5 degrees in the clockwise direction (see FIG. 13B), although this predetermined rotational increment can differ from this example. As a result, the tape cartridge transport mechanism 170 (FIG. 10) moves to the position shown in FIG. 16A2, and the cartridge pin 213 is moved to the position P1 (see FIGS. 10 and 13C). Subsequently, the turntable 140 is rotated 3.5 degrees, for example, in the counterclockwise direction, so the cartridge pin 213 engages the notch 15*a* (see FIG. 13D). Then, the tape cartridge transport mechanism 170 moves to the position shown in FIG. 16A3, and the tape cartridge 10 is transported in the Y2 direction onto the turntable 140 (see FIG. 13E).

In one embodiment, the tape cartridge transport mechanism 170 does not operate to move the tape cartridge 10 until confirmation has occurred that the tape cartridge 10 has triggered the tape cartridge ejection detecting mechanism 190 to generate the appropriate response indicative of ejection of the tape cartridge 10 from the tape drive 101. In this embodiment, the appropriate response is the shielding of the light path of the photocoupler 193*b*. However, it is recognized that other suitable responses can be utilized with the present invention, depending upon the requirements of the autoloader 100.

5 [Adjustment of Height Position of Bracket 191]

In one embodiment, the height position adjustment of the bracket 191 is performed in a process of assembling the tape cartridge autoloader 100. Alternatively, the height position adjustment of the bracket 191 can be performed after assembly, i.e. during testing, in situ or on a periodic basis as a maintenance step.

A jig (height position adjusting mechanism) 200 according to an embodiment of the present invention is used (See FIG. 14A-14G). The jig 200 has an outside configuration which is substantially the same as that of the tape cartridge 10. The jig 200 has a contact mechanism 202 provided on a front face 201 side thereof. The contact mechanism 202 includes an indication needle 204 rotatably supported by a pin 203 fixed to the front face 201. The indication needle 204 includes a contact 205 disposed in the vicinity of the pin 203. The indication needle 204 rotates as a function of the height of the contact 205, such that, for example, the indication needle 202 points to the "zero (0)" mark when the height of the contact 205 is the same as the bottom face of the jig 200. The mark indicated with reference numeral 210 indicates the highest limit, and the mark indicated with reference numeral 211 indicates the lowest limit.

The jig 200, being utilized in a manner supposing that the jig 200 is a tape cartridge ejected from the tape drive 101, has its contact 205 abut the upper face 191*a*1 of the box portion 191*a* of the bracket 191.

Figure 14A:
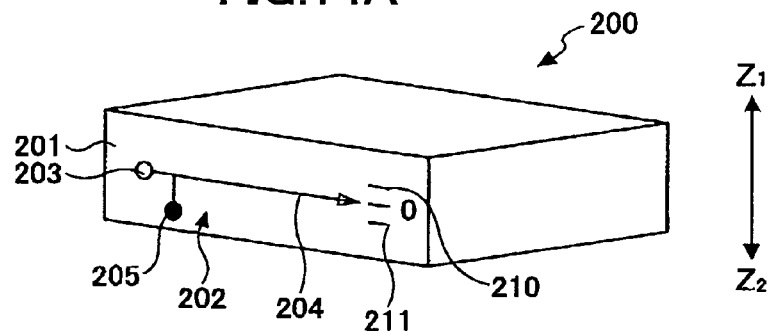
FIGS. 14A-14G are schematic illustrations showing a jig used for adjusting the height position of a bracket.
Figure 14B:
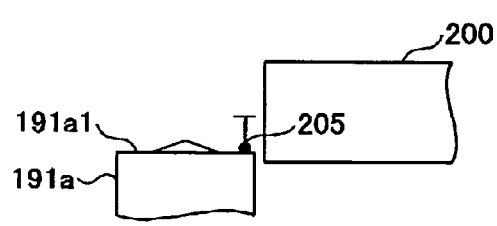
Figure 14C:
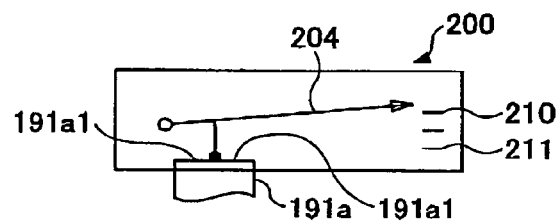
Figure 14D:
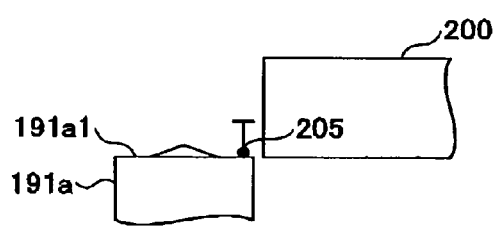
Figure 14E:
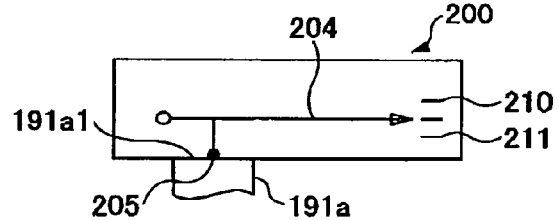
Figure 14F:
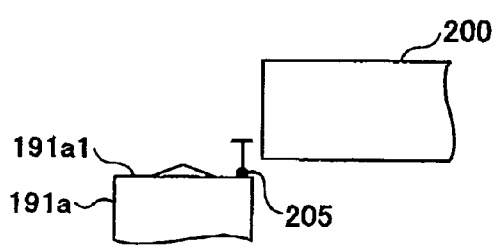
Figure 14G:
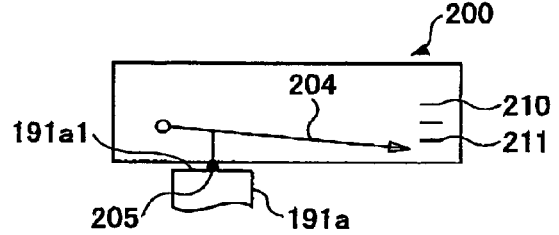

In a case where the position of the bracket 191 is too high, the indication needle 204 points to an area which is higher than the mark 210 (See FIGS. 14B and 14C). In a case where the position of the bracket 191 is too low, the indication needle 204 points to an area which is lower than the mark 211 (See FIGS. 14F and 14G).

In these cases, the position of the bracket 191 is adjusted in the Z1-Z2 direction by turning the adjustment screw 196 with a screw driver, for example. When the bracket 191 is adjusted to an appropriate height, the indication needle 204 points to the mark situated in the middle of mark 210 and mark 211 (See FIGS. 14D and 14E). In accordance with the mark pointed to by the indication needle 204, the height position of the bracket 191 is adjusted.

It is to be noted that the height position of the bracket 191 may also be adjusted when the type of the tape drive is changed, or when the type of tape cartridges used is changed, for example.

Figure 15A:
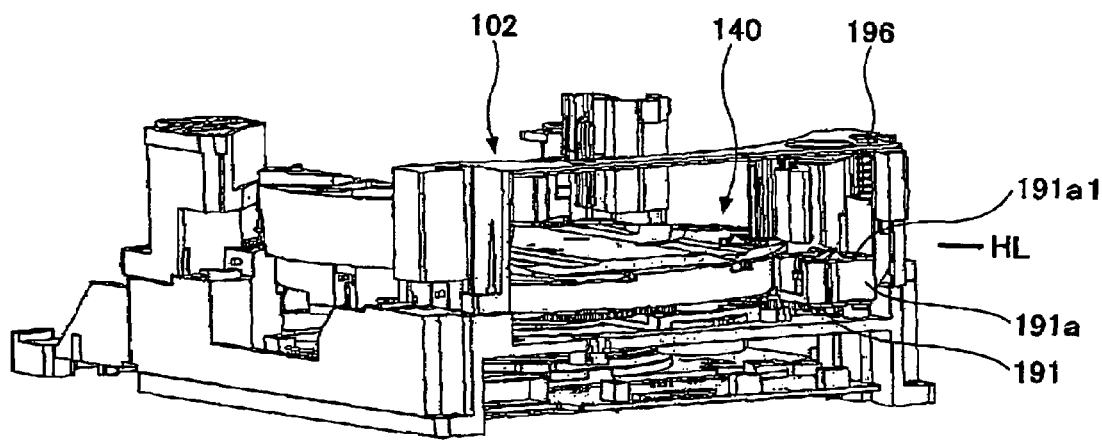
FIGS. 15A-15B are schematic illustrations showing an adjusted state where the height of the turntable and the height of the bracket are changed.

FIG. 15A illustrates a case where the tape drive has an opening in a relatively low position. In this case, the height position of the turntable 140 is adjusted to a relatively low position HL by the turntable lifting mechanism 150 and the height position of the bracket 191 is also adjusted to the relatively low position HL by turning the adjustment screw 196 with a screw driver, for example.

Figure 15B:
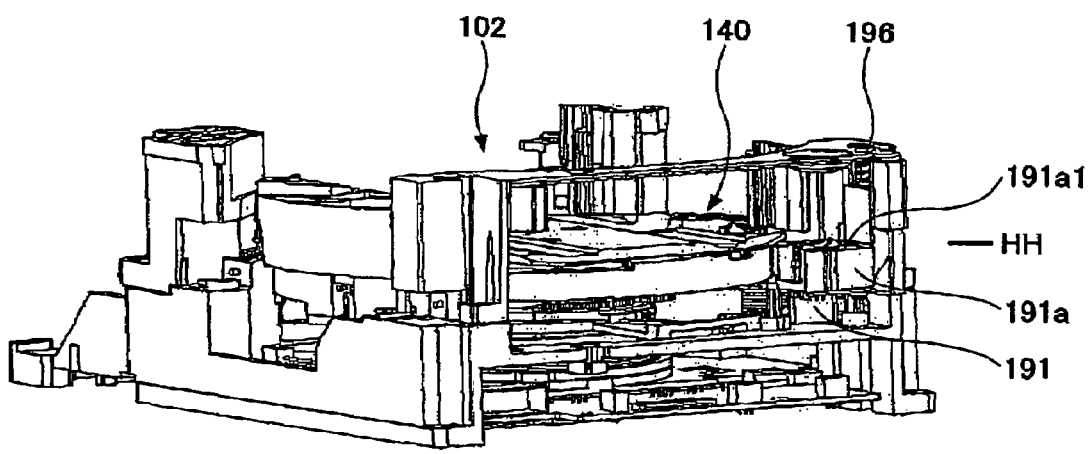

FIG. 15B illustrates a case where the tape drive has an opening in a relatively high position. In this case, the height position of the turntable 140 is adjusted to a relatively high position HH by the turntable lifting mechanism 150 and the height position of the bracket 191 is also adjusted to the relatively high position HH by turning the adjustment screw 196 with a screw driver, for example. In an alternative embodiment, turning of the adjustment screw 196 to a higher or lower position can be performed automatically instead of manually.

With the designs provided herein, even in a case where the tape cartridge is provided with a housing that is transparent, the tape cartridge ejected from the tape drive can be positively detected.

The present application is based on Japanese Priority Application No. 2005-264077 filed on Sep. 12, 2005, with the Japanese Patent Office, the entire contents of which are hereby incorporated by reference.

While the particular autoloader 100 as herein shown and disclosed in detail is fully capable of obtaining the objects and providing the advantages herein before stated, it is to be understood that it is merely illustrative of various embodiments of the invention. No limitations are intended to the details of construction or design herein shown other than as described in the appended claims.

What is claimed is:

1. A media cartridge autoloader for use with a media cartridge, the media cartridge autoloader comprising;
    a mail slot;
    a media cartridge storage section;
    a media drive into which the media cartridge is loaded; and
    a media cartridge picker for moving the media cartridge between two or more of the mail slot, the media drive and the cartridge storage section, the media cartridge picker including
        a turntable capable of supporting the media cartridge and rotating to change the orientation of the media cartridge supported thereby,
        a turntable rotating mechanism for rotating the turntable,
        a media cartridge transport mechanism provided on the turntable and configured to transport the media cartridge onto and off of the turntable, and
        a media cartridge ejection detecting mechanism provided in a position opposing the media drive;
        wherein the media cartridge ejection detecting mechanism includes a switching member to which a pressing force is applied by the media cartridge ejected from the media drive.

2. The media cartridge autoloader as claimed in claim 1, wherein the media cartridge ejection detecting mechanism further includes a bracket to which the switching member is mounted.

3. The media cartridge autoloader as claimed in claim 2, wherein the bracket includes an upper face for supporting a bottom face of the media cartridge ejected from the media drive.

4. The media cartridge autoloader as claimed in claim 2, wherein the height of the bracket is adjustable by using a height position adjusting mechanism.

5. A media cartridge picker for moving a media cartridge between two or more of a mail slot, a media drive, and a cartridge storage section included in a media cartridge autoloader, the media cartridge picker comprising:
    a turntable capable of supporting the media cartridge, the turntable rotating to change the orientation of the media cartridge supported thereby;
    a turntable rotating mechanism for rotating the turntable;
    a media cartridge transport mechanism that transports the media cartridge onto and off of the turntable; and
    a media cartridge ejection detecting mechanism provided in a position opposing the media drive;
    wherein the media cartridge ejection detecting mechanism includes a switching member to which a pressing force is applied by the media cartridge ejected from the media drive.

6. The media cartridge picker as claimed in claim 5, wherein the media cartridge ejection detecting mechanism further includes a bracket to which the switching member is mounted.

7. The media cartridge picker as claimed in claim 6, wherein the bracket includes an upper face for supporting a bottom face of the media cartridge ejected from the media drive.

8. The media cartridge picker as claimed in claim 6, wherein the height of the bracket is adjustable by using a height position adjusting mechanism.

9. A media cartridge autoloader for use with a media cartridge, the media cartridge autoloader comprising:
    a mail slot;
    a media cartridge storage section;
    a media drive into which the media cartridge is loaded; and
    a media cartridge picker for moving the media cartridge between two or more of the mail slot, the media drive and the cartridge storage section, the media cartridge picker including (i) a turntable that supports the media cartridge and rotates to change the orientation of the media cartridge, (ii) a turntable rotating mechanism that rotates the turntable, (iii) a media cartridge transport mechanism that moves the media cartridge onto and off of the turntable, and (iv) a media cartridge ejection detecting mechanism that is contacted by the media cartridge upon ejection of the media cartridge from the media drive.

10. The media cartridge autoloader as claimed in claim 9, wherein the media cartridge ejection detecting mechanism includes a switching member that is moved upon ejection of the media cartridge from the media drive.

11. The media cartridge autoloader as claimed in claim 10, wherein movement of the switching member causes interruption of a signal to inhibit movement of the media cartridge by the cartridge picker.

12. The media cartridge autoloader as claimed in claim 11, wherein the signal is a light path.

13. The media cartridge autoloader as claimed in claim 11, wherein movement of the switching member includes rotation about an axis that is substantially parallel to the direction of the media cartridge during ejection from the media drive.

14. The media cartridge autoloader as claimed in claim 10, wherein the media cartridge ejection detecting mechanism includes a height adjuster that adjusts the height of the switching member.

15. A media cartridge picker for moving a media cartridge between two or more of a mail slot, a media drive, and a cartridge storage section included in a media cartridge autoloader, the media cartridge picker comprising:
  a turntable that supports the media cartridge and rotates to change the orientation of the media cartridge;
  a turntable rotating mechanism that rotates the turntable;
  a media cartridge transport mechanism that moves the media cartridge onto and off of the turntable, and
  a media cartridge ejection detecting mechanism that is contacted by the media cartridge upon ejection of the media cartridge from the media drive.

16. The media cartridge picker as claimed in claim 15, wherein the media cartridge ejection detecting mechanism includes a switching member that is moved upon ejection of the media cartridge from the media drive.

17. The media cartridge picker as claimed in claim 16, wherein movement of the switching member causes interruption of a signal to inhibit movement of the media cartridge by the cartridge picker.

18. The media cartridge picker as claimed in claim 17, wherein the signal is a light path.

19. The media cartridge picker as claimed in claim 17, wherein movement of the switching member includes rotation about an axis that is substantially parallel to the direction of the media cartridge during ejection from the media drive.

20. The media cartridge picker as claimed in claim 16, wherein the media cartridge ejection detecting mechanism includes a height adjuster that adjusts the height of the switching member.

21. A method of transporting a media cartridge between two or more of a mail slot, a media drive, and a cartridge storage section included in a media cartridge autoloader by operating a media cartridge picker included in the media cartridge autoloader, the method comprising the steps of:
  moving the media cartridge onto a turntable;
  rotating the turntable;
  moving the media cartridge off of the turntable;
  loading the media cartridge into the media drive;
  ejecting the media cartridge from the media drive; and
  detecting ejection of the media cartridge from the media drive with a media cartridge ejection detecting mechanism.

* * * * *